United States Patent

Nakamae

[19]

[11] Patent Number: 5,963,370
[45] Date of Patent: Oct. 5, 1999

[54] SUPPORT STRUCTURE FOR TENSELY EXTENDING AND SUPPORTING FILM OR SHEET

[75] Inventor: Satoshi Nakamae, Shinjuku-Ku, Japan

[73] Assignee: Dai Nippon Printing Co., Ltd., Japan

[21] Appl. No.: 08/899,309

[22] Filed: Jul. 23, 1997

[30] Foreign Application Priority Data

| Jul. 25, 1996 | [JP] | Japan | 8-213259 |
| Aug. 7, 1996 | [JP] | Japan | 8-223257 |

[51] Int. Cl.⁶ .................................................. G03B 21/56
[52] U.S. Cl. ................................... 359/443; 359/460
[58] Field of Search .......................... 359/642, 443, 359/453, 457, 460; 348/739

[56] References Cited

U.S. PATENT DOCUMENTS

| 3,844,644 | 10/1974 | Martinez | 350/117 |
| 4,865,670 | 9/1989 | Marks | 156/99 |
| 5,013,132 | 5/1991 | Yokoo et al. | 350/128 |
| 5,200,854 | 4/1993 | Ogino et al. | 359/451 |
| 5,402,263 | 3/1995 | Kita et al. | 359/451 |

FOREIGN PATENT DOCUMENTS

| 63-53532 | 3/1988 | Japan | 359/443 |
| 64-59301 | 3/1989 | Japan | 359/642 |
| 1-167708 | 7/1989 | Japan | 359/642 |

*Primary Examiner*—Safet Metjahic
*Assistant Examiner*—Christopher E. Mahoney
*Attorney, Agent, or Firm*—Parkhurst & Wendel, L.L.P.

[57] ABSTRACT

A flexible film of a synthetic resin is arranged on a rigid support plate, and both edges of the film in the tensely extending direction are attached to fixing portions of the support plate. The support plate is fitted into a frame body via the film, so that the film is tensely extended and supported between the frame body and the support plate. The support plate has arcuate raised portions extending in parallel to the fixing portions on the side of the film. In a case where the film is arranged so as to extend along the support plate to be attached to the fixing portions, the film is pushed by the arcuate raised portions of the support plate, so that a gap is formed below the film. When the support plate is fitted into the frame body via the film, the film is pushed and extended by the angular portions of the frame body, so that the gap is stopped.

13 Claims, 10 Drawing Sheets

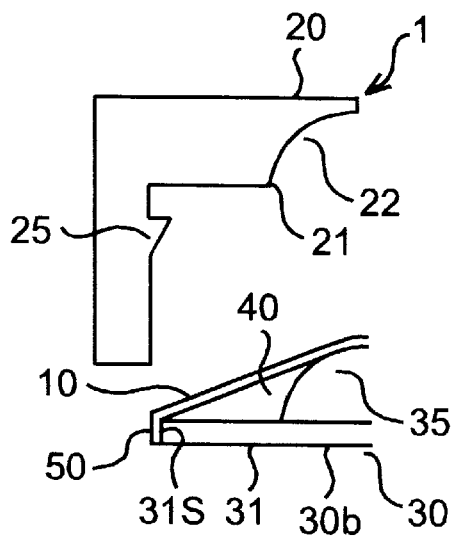
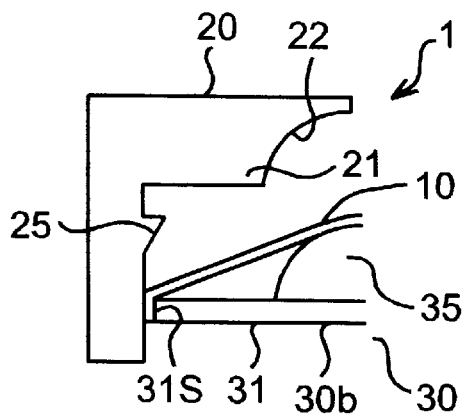
FIG. 3A  FIG. 3B
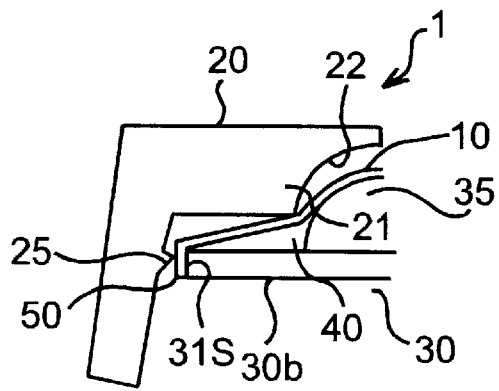
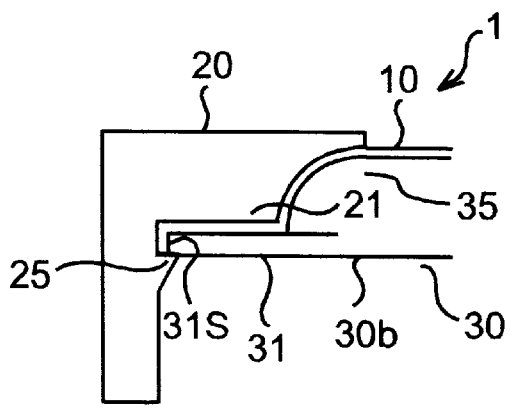
FIG. 3C  FIG. 3D

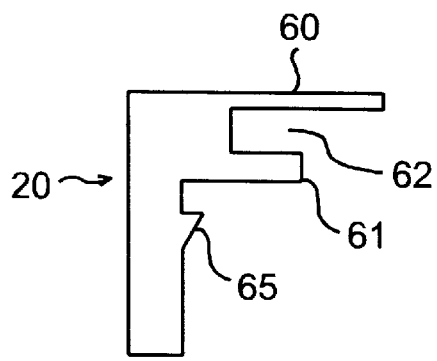
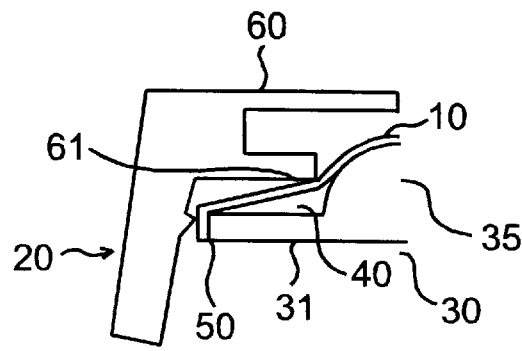
FIG. 4A    FIG. 4B
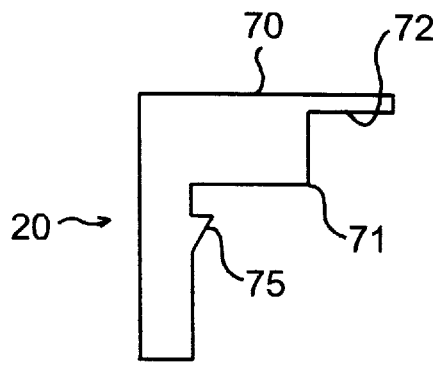
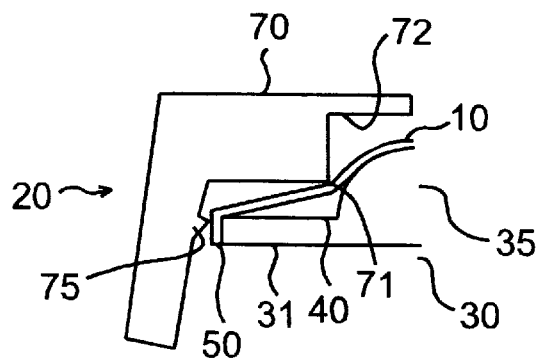
FIG. 5A    FIG. 5B

SUPPORT STRUCTURE FOR TENSELY EXTENDING AND SUPPORTING FILM OR SHEET

BACKGROUND OF THE INVENTION

1. Field of the Invention

The present invention relates generally to a support structure for tensely extending and supporting a flexible film or sheet while tensely extending the film or sheet. More specifically, the invention relates to a tensely extending support structure for tensely extending and supporting a film or sheet for a projection screen of a projection television or the like.

2. Description of the Prior Art

As conventional Fresnel lenses for projection screens of televisions and so forth, rigid relatively-thick sheets have been used. As such Fresnel lenses, circular Fresnel lenses having a plurality of concentric lenses are often used. Such circular Fresnel lenses are formed by the thermal press or by means of a mold using an ultraviolet curing resin.

In recent years, there is a demand for decreasing the thickness of a lens sheet in order to prevent the picture quality of a lens from deteriorating due to the optical loss of the lens, and there is also a demand for the continuous production in order to improve the productivity, so that lenses formed on a thin film have been produced.

For example, a linear Fresnel lens, which is formed by arranging linear lenses in parallel, is made by means of a machine, to which a gravure printing press is applied, since it has a linear shape. That is, an ultraviolet curing resin is transferred to a continuous thin film so as to have a predetermined shape, and the ultraviolet curing resin is cured by ultraviolet rays to form a linear Fresnel lens (the ultraviolet curing method).

In a case where a flexible thin film with lenses thus produced is used for a projection screen, there are known two methods for tensely extending and supporting the film. In one of the methods, the film is combined with a rigid plate, e.g., a lenticular lens sheet. In the other method, the film itself is tensely supported on a support, such as a frame and a cabinet. In order to increase the productivity by decreasing the probability of generation of wrinkles and sags and in order to decrease the thickness of the film, the latter method is preferred.

However, in the case of the latter method for tensely supporting the film with lenses on the support, it is difficult to surely secure the film to the support. It is also difficult to continue to exert tension on the film with lenses so as not to produce wrinkles therein, so that there is a need for the know-how of fixing of the film to the support. That is, in the latter method, it is required to always exert tension on the film with lenses, and it is also required that the whole film with lenses can be simply held so as not to produce wrinkles and sags.

As described above, one would wish to provide a simple tensely extending support structure, which can surely secure a flexible thin film with linear Fresnel lenses continuously produced for a projection screen to a support, such as a frame and a cabinet, which can continue to exert tension on the film without producing wrinkles and sags, and which does not need the know-how of fixing.

SUMMARY OF THE INVENTION

It is therefore an object of the present invention to eliminate the aforementioned problems and to provide a tensely extending support structure for tensely extending and supporting a film or sheet for a projection screen, which has a relatively simple structure, which does not produce wrinkles and sags in the film or sheet, which can surely fix the film or sheet thereto and which can continue to exert tension on the film or sheet.

In order to accomplish the aforementioned and other objects, according to one aspect of the present invention, there is provided a tensely extending support structure for supporting a flexible film or sheet while tensely extending the film or sheet, the tensely extending support structure comprising: a rigid support plate having a surface, on which the film or sheet is arranged, and a fixing portion, to which at least a pair of edges of the film or sheet are fixed; and a frame body, into which the support plate is fitted and which is associated with the support plate for fixing the film or sheet to the support plate, the support plate having at least a pair of arcuate raised portions, which extend substantially in parallel to the fixing portion for bring the film or sheet into to tight contact with the frame body so that a gap is formed below the film or sheet between each of the arcuate raised portions and the fixing portion when the support plate is fitted into the frame body, and the frame body being provided with a pair of angular portions, each of which is received between each of the arcuate raised portions of the support plate and the fixing portion, the angular portions stopping the gap when the support plate is fitted into the frame body.

According to another aspect of the present invention, there is provided a tensely extending support structure for supporting a flexible film or sheet while tensely extending the film or sheet, the tensely extending support structure comprising: a first frame body having a fixing portion, to which at least a pair of edges of the film or sheet are fixed; and a second frame body, into which the first frame body is fitted, the second frame body having a holding portion, which is associated with the fixing portion of the first frame body for fixing the film or sheet thereto, and a side portion being brought into contact with an outer surface of the first frame body, the holding portion of the second frame body having at least a pair of tensely extending portions, which extend substantially in parallel to the fixing portion of the first frame body for bringing the film or sheet into tight contact with an inner surface of the first frame body.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

Figure 6A:
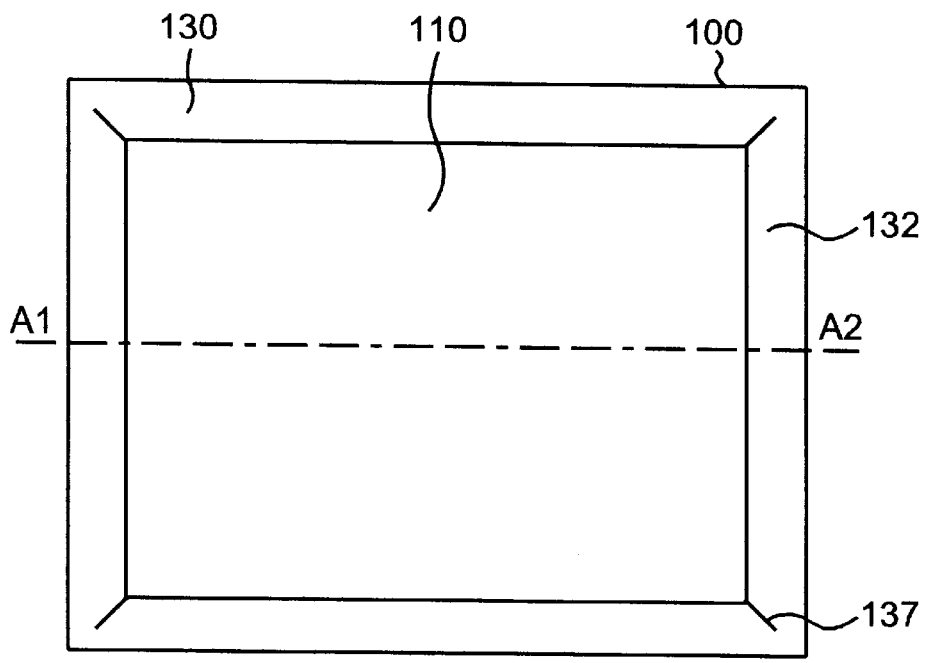
Figure 6B:
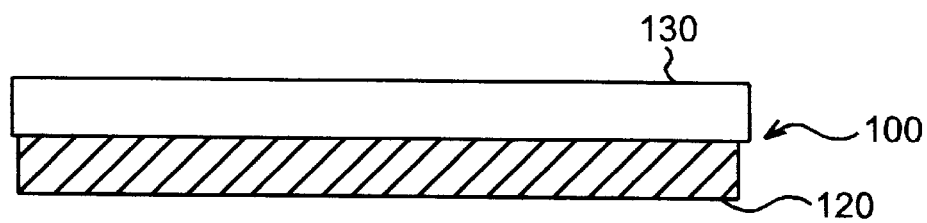
Figure 6C:
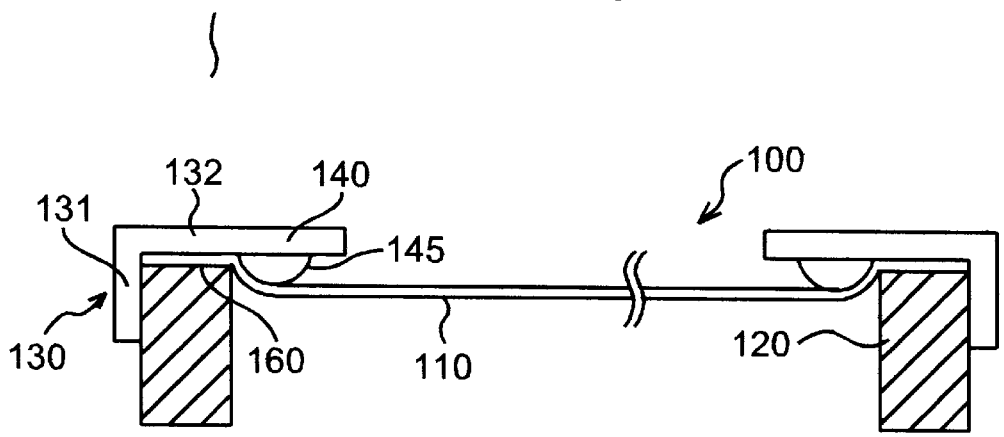
Figure 7A:
Figure 7B:
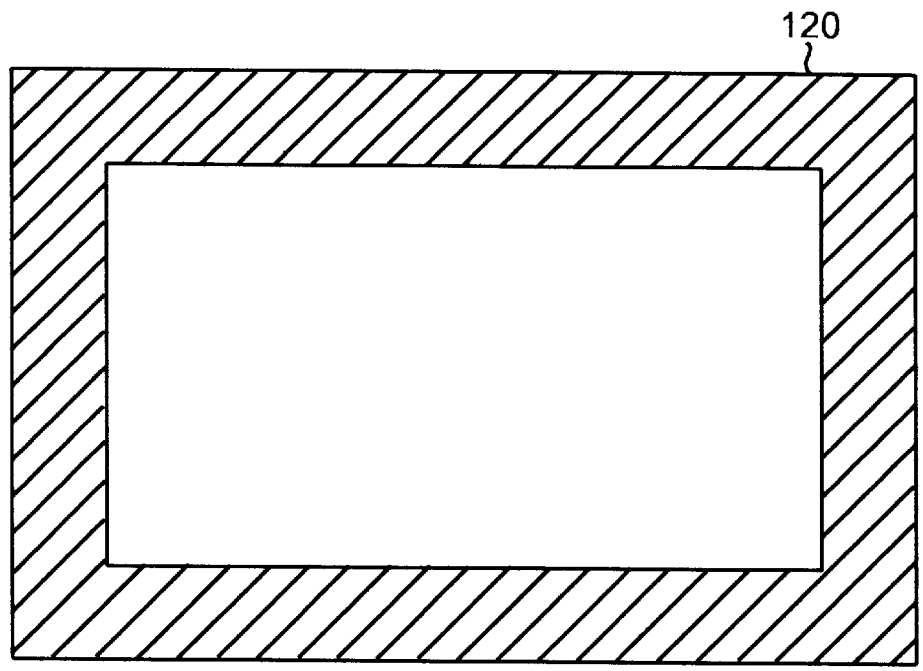
Figure 7C:
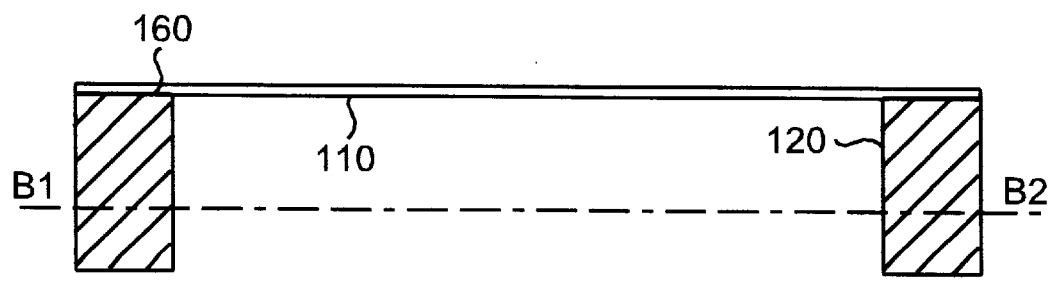
Figure 8A:
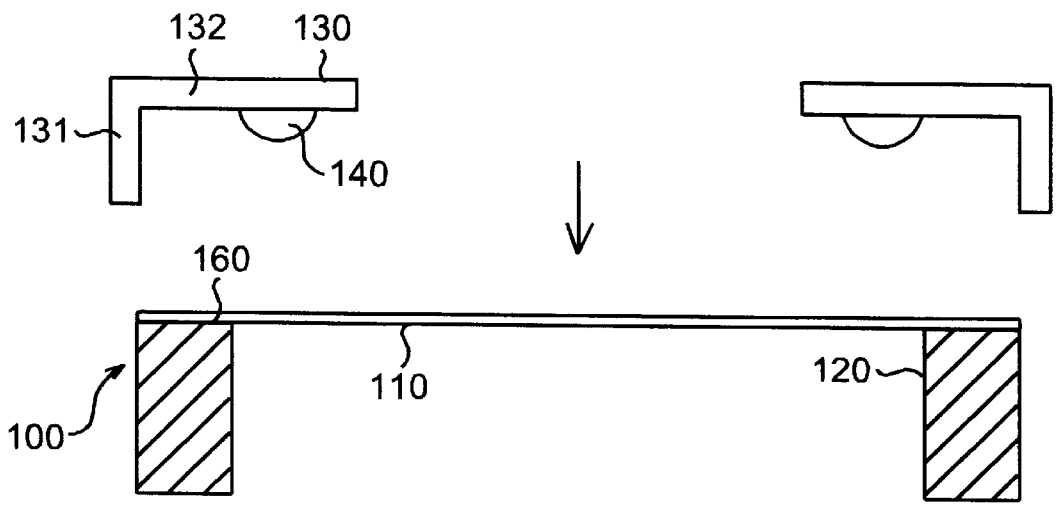
Figure 8B:
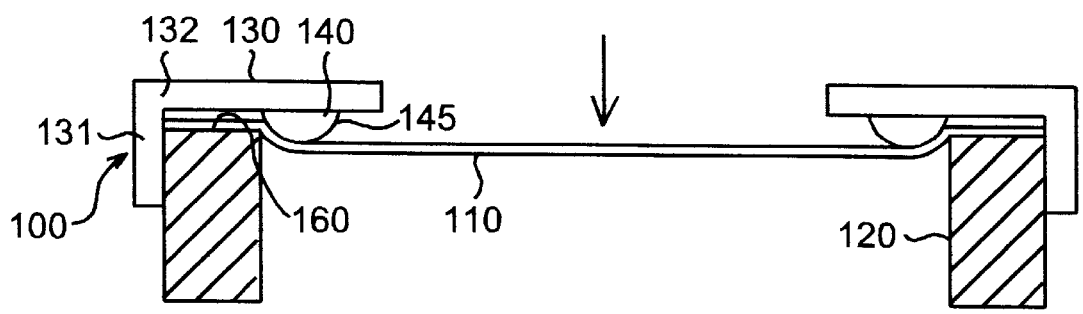
Figure 8C:
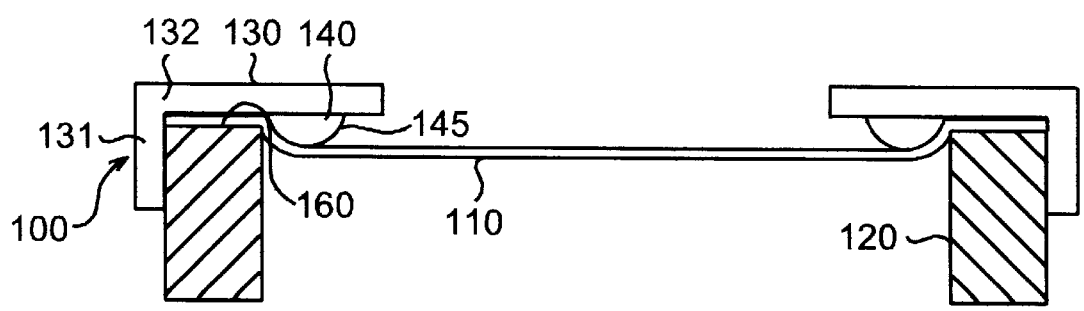
Figure 9A:
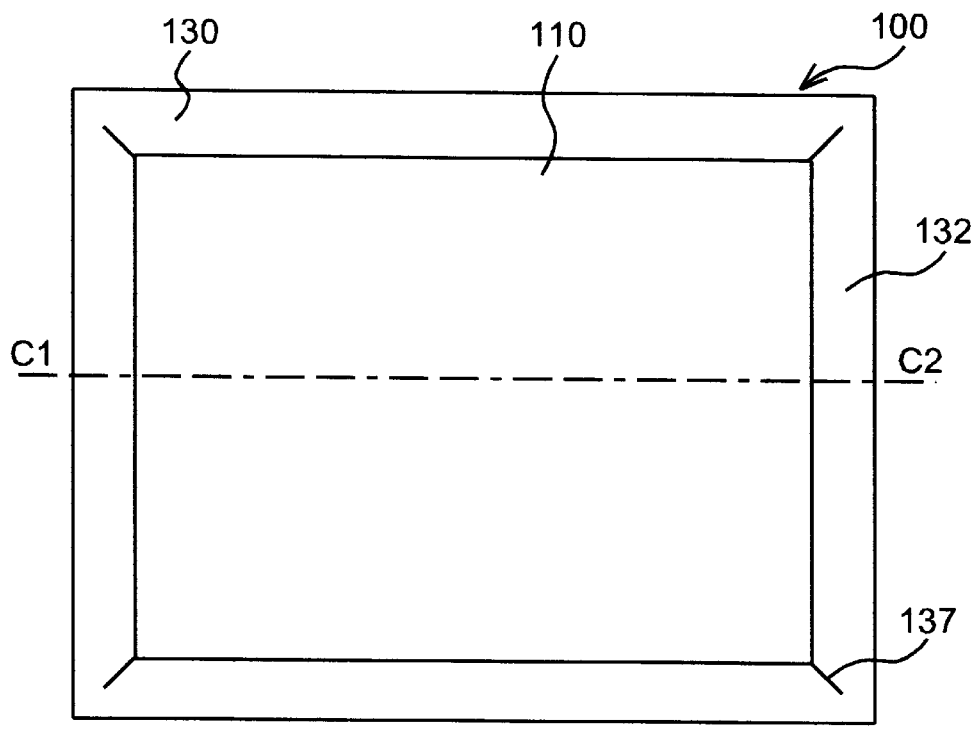
Figure 9B:
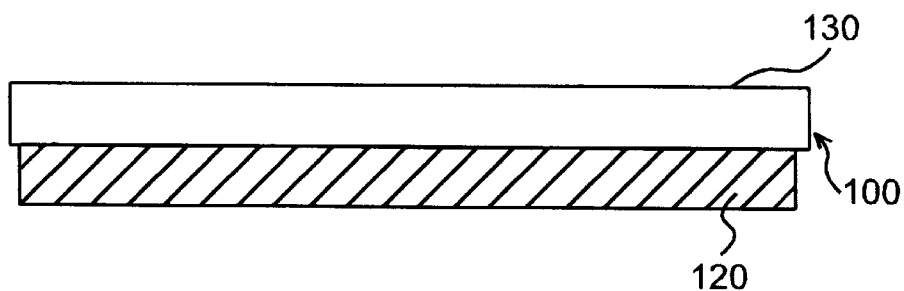
Figure 9C:
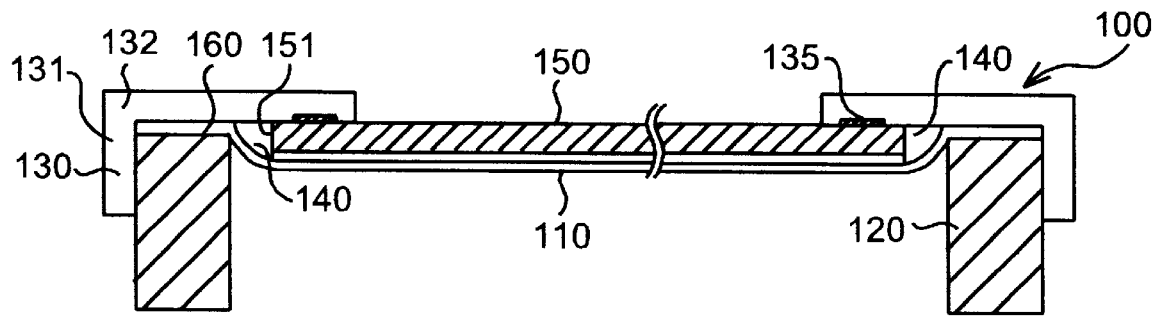
Figure 10A:
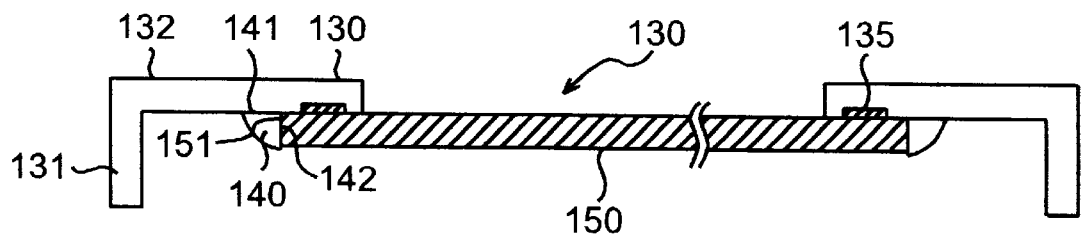
Figure 10B:
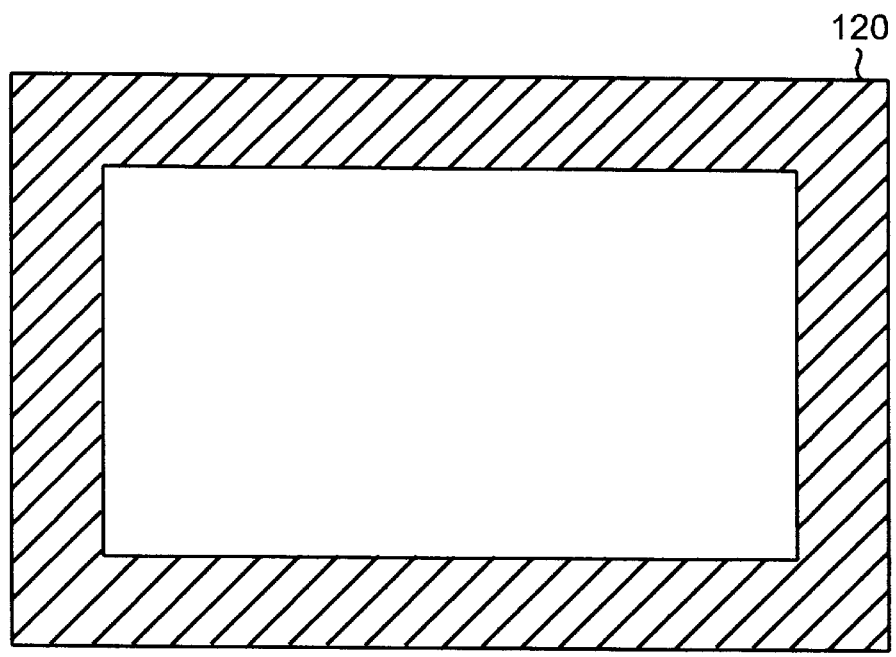
Figure 10C:
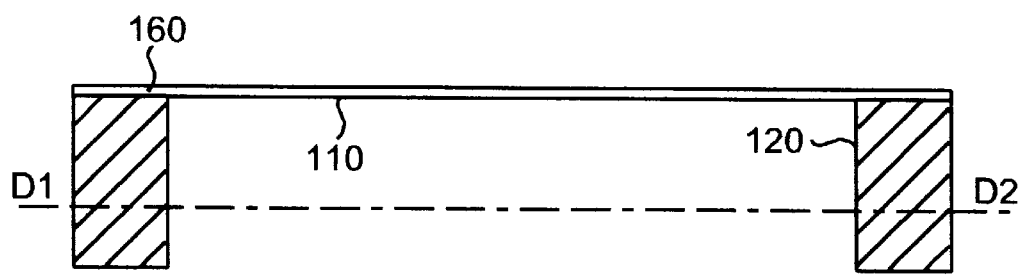
Figure 11A:
Figure 11B:
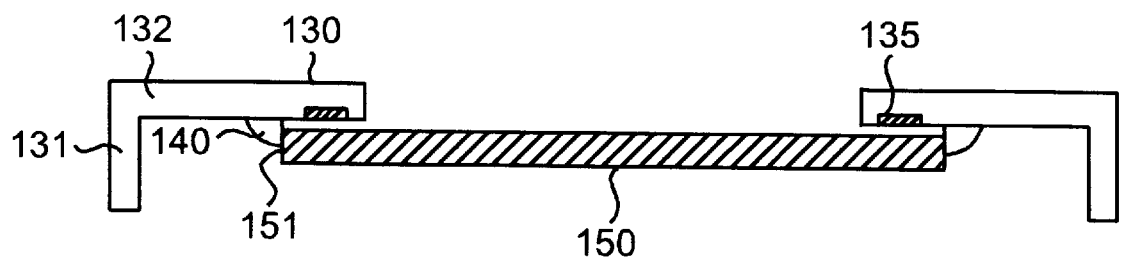
Figure 11C:
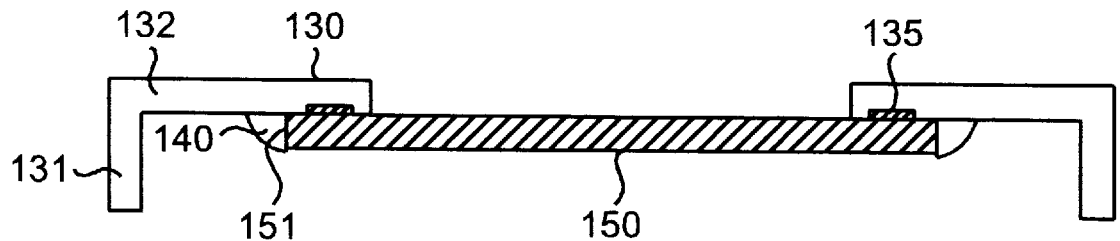

FIGS: 3A through 3D are views showing the operations of the tensely extending and supporting structure with respect to a film or sheet;

FIGS. 4A and 4B are views depicting a modified example of a frame body;

FIGS. 5A and 5B are views depicting another modified example of a frame body;

FIG. 6A is a plan view of a second preferred embodiment of a tensely extending support structure for a film or sheet, according to the present invention;

FIG. 6B is a side view of the tensely extending support structure of FIG. 6A;

FIG. 6C is a sectional view of the tensely extending support structure taken along line A1–A2 of FIG. 6A;

FIGS. 7A through 7C are views depicting the state of the tensely extending support structure before and after the tensely extending and supporting;

FIGS. 8A through 8C are views depicting the operation of the tensely extending support structure;

FIGS. 9A through 9C are views showing a modified example of a tensely extending support structure;

FIGS. 10A through 10C are sectional views explaining the state of the tensely extending support structure shown in FIGS. 9A through 9C before and after the tensely extending and supporting by the tensely extending support structure; and FIGS. 11A through 11C are views depicting a process for mounting a rigid plate on a second frame body.

DESCRIPTION OF THE PREFERRED EMBODIMENTS

[First Preferred Embodiment]

Referring now to the accompanying drawings, particularly to FIGS. 1A through 5B, a first preferred embodiment of a tensely extending support structure for supporting a film or sheet, according to the present invention, will be described below.

Figure 1A:
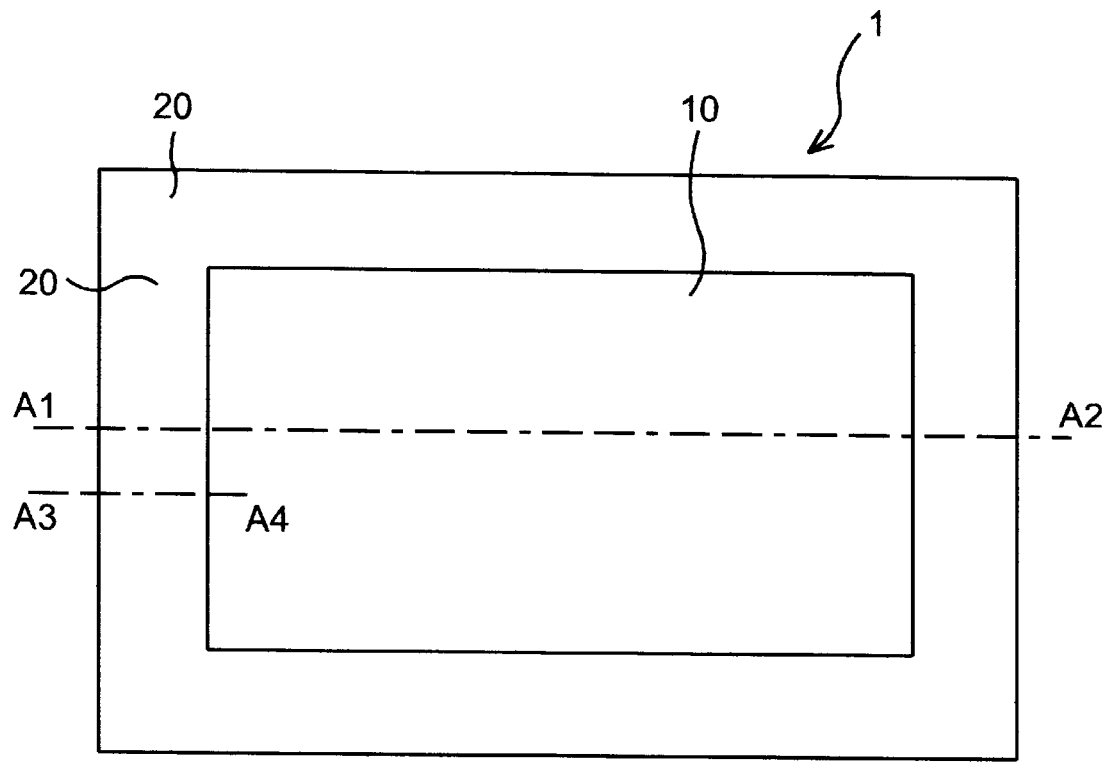
FIG. 1A is a plan view of a first preferred embodiment of a tensely extending support structure for a film or sheet, according to the present invention.
Figure 1B:
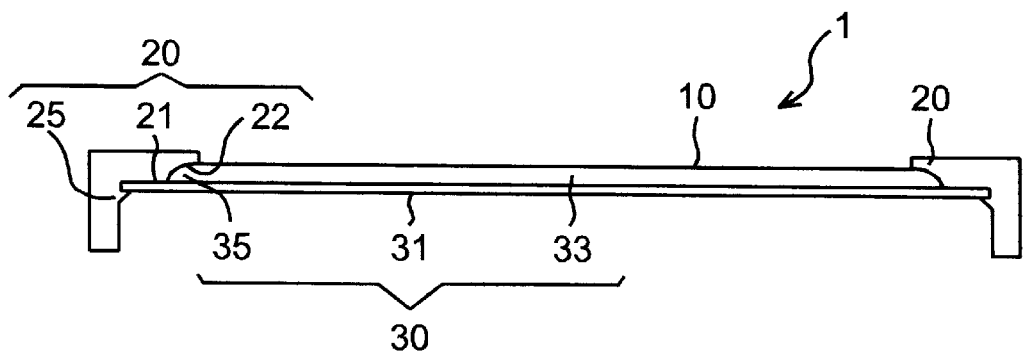
FIG. 1B is a sectional view of the tensely extending support structure taken along line A1–A2 of FIG. 1A.
Figure 2A:
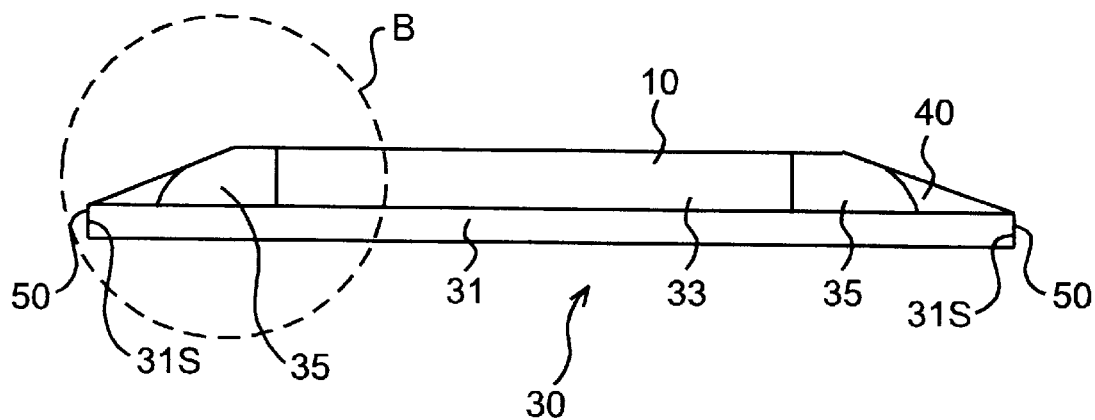
FIG. 2A is a view showing a film extended on a support plate.
Figure 2B:
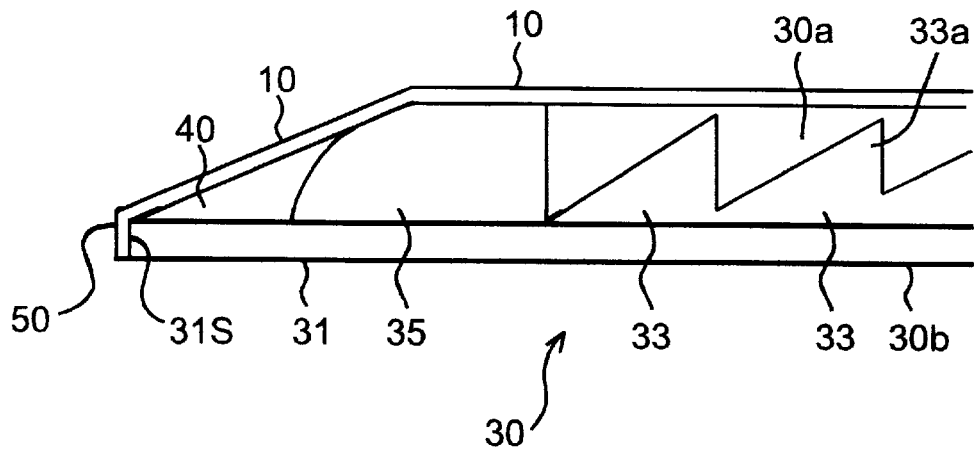
FIG. 2B is an enlarged view of portion B of FIG. 2A.

FIG. 1A is a plan view of a tensely extending support structure, on which a film or sheet is tensely extended and supported, and FIG. 1B is a sectional view taken along line A1–A2 of FIG. 1A. FIG. 2A is a sectional view of a film tensely extended and supported on a rigid support plate, and FIG. 2B is an enlarged view of portion B of FIG. 2A.

As shown in FIGS. 1A through 2B, the tensely extending support structure 1 for supporting a film or sheet comprises: a rigid support plate 30 having a surface 30a, on which a flexible film or sheet (which will be hereinafter referred to as a "film") 10 for a projection screen is arranged; and a frame body 20, into which the support plate 30 is fitted and which causes the film 10 to be fixed between the frame body 20 and the support plate 30.

The film 10 has a rectangular shape. Although a linear Fresnel lens is formed on the film 10, it is not always required to form the linear Fresnel lens on the film 10. Other types of lenses, such as a circular Fresnel lens, a lenticular lens and a prism lens, may be formed on the film 10.

The support plate 30 comprises a rectangular flat sheet 31, and a lens portion 33 of a plurality of lenses 33a formed on the flat sheet 31. A surface 30a of the support plate 30 is formed by the lens portion 33. Two pairs of edges of film 10 are fixed to two pairs of side faces 31S of the flat sheet 31, so that the side faces 31S serve as a fixing portions.

The flat sheet 31 has arcuate raised portions 35, which extend in parallel to the side faces 31S of the flat sheet 31 outside of the lens portion 33 to bring the film 10 into tight contact with the frame body 20. Before the support plate 30 is fitted into the frame body 20, a gap 40 is formed below the film 10 extending from each of the arcuate raised portions 35 to the corresponding side face 31S of the flat sheet 31.

In this preferred embodiment, the lens portion 33 should not be limited to the linear Fresnel lens, but it may be another lens, such as a circular Fresnel lens, a lenticular lens or a prism lens.

For example, in a case where a lenticular lens is formed on the film 10, a circuit Fresnel lens, a lenticular lens or a prism lens may be formed to be combined with the film 10.

In a case where a linear Fresnel lens is formed on the film 10, another linear Fresnel lens extending in a direction perpendicular thereto may be formed as the lens portion 33.

According to the present invention, the tensely extending support structure 1 may be used so that the bottom side in FIG. 11B is an observer side. In that case, a lenticular lens may be formed on the film 10, and a diffusion layer of a mat or a diffusion coating, a reflection reducing layer, or a hard coat may be substituted for the lens portion provided on the support plate 30, to be used as a front plate. Alternatively, a circular Fresnel lens may be formed on the film 10, and a lenticular lens serving as the lens portion 33 may be formed on the support plate 30.

The frame body 20 has a rectangular shape. The frame body 20 is provided with angular portions 21 arranged between each of the arcuate raised portions 35 of the support plate 30 and the corresponding side face 31S of the flat sheet plate 31. When the support plate 30 is fitted into the frame body 20, the angular portions 21 tensely extend the film 10 to eliminate the gaps 40 below the film 10. Preferably, the angular portions 21 have resiliency so as to adjust tensile force.

The frame body 20 is also formed with recessed portions 23 near the angular portions 21. Each of the recessed portions 23 receives therein the corresponding arcuate raised portion 35 of the support plate 30. The frame body 20 has flexibility. The frame body 20 has also protruding portions 25 on the inner surface thereof. The protruding portions 25 are designed to engage with the other surface 30b of the support plate 30, i.e., the reverse surface of the flat sheet 31 to the surface 30a, to secure the support plate 30 to the frame body 20.

The frame body 20 also serves as an outer frame, and has a simple structure as a whole.

As described above, according to the present invention, the tensely extending support structure 1 for tensely extending and supporting the flexible film 10 of a synthetic resin along the rigid support plate 30 so as not to produce wrinkles and sags is used for a projection screen. As shown in FIGS. 2A and 2B, the film 10 is extended on the side of the lens portion 33 of the support plate 30, and as shown in FIG. 1B, the support plate 30 is fitted into the frame body 20 so that the film 10 is brought into contact with the frame body 20. Thus, the film 10 is tensely extended and supported on the tensely extending support structure 1.

Although the tensely extending support structure 1 can be effectively used for tensely extending and supporting a television projection screen of a flexible film 10 on the rigid support plate 30, the use thereof should not be limited thereto.

The process for tensely extending and supporting the film 10 will be described in detail below.

As shown in FIGS. 2A and 2B, the edges of the film 10 are attached to the side faces 31S of the flat sheet 31 of the support plate 30 by means of heat seals. Since both ends of the support plate 30 in the tensely extending directions of the film are provided with circular, arcuate raised portions 35, there is a gap 40 between each of the raised portions 36 and the corresponding side face 31 of the flat sheet 31 of the support plate 30 when the film 10 is extended on the support plate 30. As shown in FIGS. 2A and 2B, if the support plate 30, on which the film 10 is extended, is fitted into the frame body 20 via the film 10, the film 10 is pushed by the angular portions 21 of the frame body 20 so that the whole film 10 is extended. Thus, the gap 40 is gradually decreased to be substantially eliminated as shown in FIG. 1B.

That is, the film 10 is extended so as to eliminate the gap 40, as a result the whole film 10 is tensely extended.

The edges of the film 10 are attached to the side faces 31S of the flat sheet 31 of the support plate 30. When the 20 support plate 30 is fitted into the frame body 20, heat seal portions 50 of the film 10 attached to the side faces 31S are sandwiched between the frame body 20 and the support plate 30 to be fixed thereto as shown in FIG. 1B.

Thus, the film 10 is secured to the support plate 30 by means of the frame body 20.

While the film 10 has been fixed to the side faces 31S of the support plate 30 by means of the heat seals in this preferred embodiment, the present invention should not be limited thereto, but it may be fixed by the ultrasonic fusion method or the like.

In this preferred embodiment, the frame body 20 has the arcuate recessed portions 22, each of which has the shape corresponding to that of the corresponding arcuate raised portion 35 so that the arcuate recessed portion 22 tightly engages with the raised portion 35 via the film 10. Thus, it is possible to more surely carry out the tensely extending of the film 10.

Although the frame body 20 may be made of polypropylene, it may be made of a harder material, such as polyvinyl chloride or metallic materials, e.g., aluminum, in accordance with the tensely extending force or tensile force desired.

Modified examples of a frame body 20 are shown in FIGS. 4A through 5B. As shown in FIG. 4A, the frame body 20 may be formed with an angular portion 61, a recessed portion 62, and a protruding portion 65. In this case, when the support plate 30 is fitted into the frame body 20 as shown in FIG. 4B, the film 10 is tensely extended by the angular portion 61.

Alternatively, as shown in FIG. 5A, the frame body 20 may be formed with an angular portion 71, a recessed portion 72 and a protruding portion 75. In this case, when the support plate 30 is fitted into the frame body 20 as shown in FIG. 5B, the film is tensely extended by the angular portion 71.

The angular portion 61 shown in FIGS. 4A and 4B and the angular portion 71 shown in FIGS. 5A and 5B should be made of a material having a suitable resiliency so as to exert the, unnecessary reaction force against the tensile force exerted on the film 10.

In this preferred embodiment, the support plate 30 is fitted into the frame body 20 via the film 10 on two pairs of opposing sides of the substantially rectangular frame body 20. While the film 10 has been tensely extended by the support plate 30 in two directions, the tensely supporting of the film 10 may be more simple so that the film 10 is tensely extended in one direction.

The height of the arcuate raised portion 35 of the support plate 30 is higher than that of the respective lenses 33a of the lens portion 33 of the support plate 30, so that the raised portion 35 is not under the influence of the shapes of the lenses 33a.

Referring to FIGS. 3A through 3D, the operation of the tensely extending support structure 1, according to the present invention, will be described in detail below.

Each of FIGS. 3A through 3B shows only a cross section of a portion taken along lines A3–A4 of FIG. 1A for simple explanation.

First, the support plate 30, on which the film 10 is extended, and the frame body 20 are prepared. The frame body 20 and the support plate 30 are gradually approached to a position, at which the support plate 30 is fitted into the frame body 20 via the film 10 (FIG. 3A). In this case, the gap 40 is formed below the film 10 between the raised portion 35 and the side face 31S of the support plate 30.

Then, the support plate 30 is gradually fitted into the frame body 20 while the inner wall of the frame body 20 facing the side wall 31S is brought into contact with the heat seal portion 50 attached to the side face 31S (FIG. 3B).

As of the frame body 20 engages with the support plate 30 is advanced, the angular portion 21 contacts the film 10 and pushes the film 10 to extend the whole film 10 to gradually decrease the gap 40 (FIG. 3C).

At this time, the protruding portion 25 formed on the side wall of the frame body 20 gradually passes through the side face 31S, and the side wall of the frame body 20 is deflected.

At the same time that the protruding portion 25 of the frame body 20 completely passes through the side face 31S, the arcuate raised portion 35 is tightly fitted into the arcuate recessed portion 22 via the film 10 to stop the gap 40 (FIG. 3D).

If the film 10 is attached to the heat seal portion 50 with excessive adhesion, the support plate 30 can be more surely fixed to the frame body 20 via the film 10, because the film 10 is wound onto the reverse surface 30b of the support plate 30 by the protruding portion 25 when the support plate 30 is fitted into the frame body 20.

As described above, according to the present invention, it is possible to surely carry out the tensely extending and supporting of the film 10 with a simple structure.

In particular, when the flexible thin film 10, which is used for a television projection screen, is tensely extended along the rigid support plate 30, it is possible to surely tensely extend the film 10.

[Second Preferred Embodiment]

Referring to FIGS. 6A through 8C, a second preferred embodiment of a tensely extending support structure for a film or sheet, according to the present invention, will be described below.

FIG. 6A is a plan view of the tensely extending support structure, on which a film or sheet is tensely extended and supported, FIG. 6B is a front view of FIG. 6A, and FIG. 6C is a sectional view taken along line A1–A2 of FIG. 6A. FIGS. 7A through 7C show a first frame body 120, a film 110 and a second frame body 130 before the film 110 is tensely extended and supported.

FIGS. 7A and 7C are sectional views taken along a line corresponding to line A1–A2 of FIG. 6A, and FIG. 7B is a sectional view taken along line B1–B2 of FIG. 7C.

As shown in FIGS. 6A through 7C, a tensely extending support structure 100 for a film or sheet, comprises: a first frame body 120 having a fixing portion 160, on which two pair of edges of a flexible, rectangular film 110 are fixed; and a second frame body 130, into which the first frame body 120 is fitted.

The first frame body 120 has a rectangular shape, and the second frame body 130 also has a rectangular shape. The second frame body 130 has a holding portion 132 for fixing the film 110 to the fixing portion 160 of the first frame body 120, and a side portion 131 contacting the outer surface of the first frame body 130.

The holding portion 132 of the second frame body 130 is provided with a tensely extending portion 140, which extends substantially in parallel to the fixing portion 160 of the first frame body 120 for bringing the film 110 into tight contact with the inner surface of the first frame body 120. The outer surface of the tensely extending portion 140 is formed with a curved-face portion 145.

The four corners of the second frame body 130 are provided with cut-outs 137 which are arranged at locations inside of the holding portion 132. The first and second frame bodies 120 and 130 also serve as outer frames.

As described above, according to the present invention, a tensely extending support structure for a projection screen tensely extends and supports the flexible film 10 of a synthetic resin so as not to produce wrinkles and sags. As shown in FIGS. 6A through 7C, the second frame body 130 is put on the first frame body 120 via the film 110 to tensely extend and support the film 110. In this case, although a linear Fresnel lens is formed on the film 110, it is not always required to form the linear Fresnel lens thereon, and other types of lenses, such as a circular Fresnel lens, a lenticular lens or a prism lens, may be formed thereon. Alternatively, a diffusion layer of a mat or a diffusion coating, or a coloring layer may be formed thereon.

As shown in FIG. 7B, the first frame body 120 comprises a rectangular frame, and has a flat surface serving as the fixing portion 160, to which the film 110 is attached. The second frame body 130 comprises the side portion 131 for covering the outer surface of the first frame body 120, and the holding portion 132 for fixing the film 110 to the fixing portion 160 of the first frame body 120. The second frame body 130 is provided with the resilient tensely extending portion 140, which tensely extends the whole film 110 extending along the first frame body 120 while bringing the film 110 into tight contact with the inner surface of the first frame body 120.

As shown in FIG. 6B, both edges of the film 110 in the tensely extending directions are attached to the fixing portion 160 of the first frame body 120 by heat seal, an ultrasonic fusion method, or a pressure sensitive adhesive double coated tape. In this state, the second frame body 130 is gradually brought into contact with the first frame body 120. Then, the whole film 110 is tensely extended while bringing the film 110 in tight contact with the first frame body 120 by means of the curved-face portion 145 of the tensely extending portion 140, so that the second frame body 130 is fixed to the first frame body 120.

The four corners of the second frame body 130 are provided with the cut-outs 137 which are arranged at locations inside of the holding portion 132, so that the four sides of the second frame body 130 can move slightly. Therefore, as shown in FIGS. 6A and 6B, even if the film 110 expands and contracts due to temperature changes and so forth while the film 110 is tensely extended and supported, the four sides of the second frame body 130 can move slightly, so that the film 110 can be tensely extended by a substantially constant tensile force.

While the material of the second frame body 130 may be acrylic, it should not be limited thereto, but other materials may be used as long as the four sides of the second frame body 130 can move slightly in accordance with the tensile force. The materials of the second frame body 130 may include a hard polyvinyl chloride and so forth.

While the material of the first frame body 120 may be iron, it should not be limited thereto, but it may be another metal, such as aluminum, or a reinforced resin.

While the material of the tensely extending portion 140 mounted on the second frame body 130 may be a hard rubber, other materials may be used as long as the materials have resiliency and allow the film 110 to slide on the curved-face portion 145.

Referring to FIGS. 8A through 8C, the operation of the tensely extending support structure 100, in this preferred embodiment, will be simply described below.

FIG. 8A shows a simplified cross section of a portion taken along lines A1–A2 of FIG. 6A for simple explanation.

First, after the edges of the film 110 are fixed to the fixing portion 160 on the four sides of the first frame body 120 by means of the heat seal, the first frame body 120, on which the film 110 is extended, and the second frame body 130 are gradually brought into contact with each other (FIG. 8A).

After the frame bodies 120 and 130 are brought into contact with each other, the curved-face 145 of the tensely extending portion 140 brings the film 110 into tight contact with the first frame body 120 to extend the film 110. Since the film 110 slides on the curved-face portion 145, the whole film 110 can be substantially uniformly extended (FIG. 8B). Thus, the whole film 110 is tensely extended.

After the frame bodies 120 and 130 are further brought into contact with each other, when the holding portion 132 of the second frame body 130 is brought into tight contact with 15 the fixing portion 160 of the first frame body 120, the frame bodies 120 and 130 are fixed to each other (FIG. 8C).

Adhesive is applied between the side portion 131 of the second frame body 130 and the outer surface of the first frame body 120, so that the first and second frame bodies 120 and 130 are fixed to each other (FIG. 8C).

Referring to FIGS. 9A through 11C, a modified example of the tensely extending support structure 100, according to the present invention, will be described below.

FIG. 9A is a plan view of a modified example of a tensely extending support structure after a film is tensely extended and supported on the tensely extending support structure, FIG. 9B is a front view of FIG. 9A, and FIG. 9C is a sectional view taken along line C1–C2 of FIG. 9A. FIGS. 10A through 10C show a first frame body 120 and a second frame body 130 before a film 110 is tensely extended and supported therein.

FIGS. 10A and 10C are sectional views taken along a line corresponding to line C1–C2 of FIG. 9A, and FIG. 10B is a sectional view taken along line D1–D2 of FIG. 10C.

The modified example shown in FIGS. 9A through 11C is substantially the same as the preferred embodiment shown in FIGS. 6A through 8C, except that a holding portion 131 of the second frame body 130 is provided with a rigid plate 150 between a pair of tensely extending portions 140.

The tensely extending support structure 100 shown in FIGS. 9A through 11C is used for a projection screen to tensely extend and support a flexible film (a film with lenses) 110 of a synthetic resin so as not to produce wrinkles and sags. As shown in FIGS. 9A through 9C, the film 110 is tensely extended and supported while the first frame body 120 is covered with the second frame body 130 via the film 110.

As shown in FIG. 10C, both edges of the film 110 in the tensely extending directions are attached to the fixing portion 160 of the first frame body 120 by a heat seal. In this state, the second frame body 130, to which the rigid plate 150 is fixed, is gradually approaches the first frame body 120. Then, the whole film 110 is tensely extended while the film 110 is brought into tight contact with the first frame body 120 by means of the curved-face portion 145 of the tensely extending portion 140, so that the second frame body 130 is fixed to the first frame body 120.

The rigid plate 150 of the second frame body 130 is bonded to the holding portion 132 by means of adhesive 135 and clamped between the pair of tensely extending portions 140. Thus, the rigid plate 150 is rigidly fixed to the holding portion 132.

Thus, the rigid plate 150 is bonded to the holding portion 132 of the second frame body 130, and the sides 151 are secured to the pair of tensely extending portions 140. The cross section of the tensely extending portion 140 taken along a vertical surface is sector, one side 141 of which contacts the holding portion 132 of the second frame body 130, and the other side 142 of which contacts the side 151 of the rigid plate 150. The radius of the sector is smaller than the thickness of the rigid plate 150.

In this case, the rigid plate 150 means a plate that does not have a flexibility like "films", and the rigid plate has a thickness thicker than that (~300μm) of ordinally flexible films.

The four corners of the second frame body 130 are provided with cut-outs 137 at locations inside of the holding portion 132, so that four sides of the second frame body 130 can move slightly. As shown in FIGS. 9A through 9C, even if the film 110 expands and contracts due to temperature changes and so forth while the film 110 is tensely extended and supported, the film 110 can be tensely extended by a substantially constant tensile force.

The second frame body 130 can be fixed to the first frame body 120 by bonding the facing side portions to each other by means of adhesive.

Since the rigid plate 150 is exposed to the outside as shown in FIGS. 9A through 9C, the rigid plate 150 is made of a rigid material, such as an acrylic resin, e.g., polymethyl methacrylate, to which various processes, such as an antistatic process and a reflection reducing process, are applied.

Referring to FIGS. 11A through 11C, a process for fixing the rigid plate 150 to the second frame body 130 will be described below.

FIGS. 11A through 11C show cross sections taken along line C1–C2 of FIG. 9A. FIG. 11A shows the second frame body 130 before the rigid plate 150 is fixed thereto, and FIG. 11C shows the second frame body 130 after the rigid plate 150 is fixed thereto. FIG. 11B shows an intermediate state between the states shown in FIGS. 11A and 11C.

The sides 151 of the rigid plate 150 are fixed by means of the pair of tensely extending portions 140. The second frame body 130 is put on the first frame body 120 so that the film 110 is tensely extended. Before the rigid plate 150 is fixed to the tensely extending portion 140, the interior angle between the sides 141 and 142 of the sector cross section is greater than 90° as shown in FIG. 11A.

In the state shown in FIG. 11A, in a case where the rigid plate 150 is fixed, the rigid plate 150 is fitted into a space between the tensely extending portions 140 provided on the holding portion 132 of the second frame body 130. Thus, the shape of the cross section of the tensely extending portion 140 is gradually changed, so that the interior angle between the sides 141 and 142 of the sector cross section of each of the tensely extending portions 140 is substantially 90° as shown in FIG. 11B. Then, one surface of the rigid plate 150 is attached to the holding portion 132 of the second frame body 130 by means of the adhesive 135, so that the rigid plate 150 is fixed to the holding portion 132.

According to the present invention, it is possible to surely tensely extend and support the film with a simple structure. In particular, it is possible to surely carry out the tensely extending and supporting of a flexible thin film 110 or sheet for a television projection screen.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In combination, a flexible optical lens comprising at least one of a film and sheet and a tensely extending support structure for supporting the flexible optical lens while tensely extending the flexible optical lens, said tensely extending support structure comprising:

a rigid support plate having a top surface on which the flexible optical lens is positioned tensely, and a fixing portion at each end, to which at least one of a pair of opposite edges of the flexible optical lens is fixed; and a frame body, into which said rigid support plate is fitted so that at least one of the pair of opposite edges of the flexible optical lens is fixed therebetween;

said rigid support plate having at least a pair of arcuate raised portions, each arcuate raised portion being adjacent to one fixing portion and curving away therefrom to contact tightly the flexible optical lens with said frame body so that a gap is formed below the flexible optical lens between each one of said arcuate raised portions and its adjacent fixing portion before said rigid support plate is fitted into said frame body, and said frame body being provided with a pair of angular portions, each angular portion being received between one of said arcuate raised portions and its adjacent fixing portion, said angular portions eliminating said gap when said rigid support plate is fitted into said frame body.

2. The combination according to claim 1, wherein said flexible optical lens comprises at least one of a film and sheet for a screen, and a plurality of flexible optical lenses is formed on the surface of said rigid support plate, on which said flexible optical lens is positioned tensely.

3. The combination according to claim 2, wherein said arcuate raised portions have an upper surface that is higher than an upper surface of said Plurality of flexible optical lenses formed on said surface of said rigid support plate.

4. The combination according to claim 1, wherein said angular portions of said frame body have resiliency so as to adjust a tensile force of the flexible optical lens.

5. The combination according to claim 1, wherein said frame body has, near said angular portions, recessed portions, each of which receives therein each of said rigid arcuate raised portions of said support plate.

6. The combination according to claim 1, wherein two pairs of edges of said flexible optical lens are fixed to the fixing portion, and the arcuate raised portions of the frame body are curved so as to correspond to said fixing portion of said rigid support plate.

7. The combination according to claim 1, wherein said frame body has flexibility, and a protruding portion, which engages with the a bottom surface of said rigid support plate, is provided on an internal surface of said frame body.

8. In combination, a flexible optical lens comprising at least one of a film and sheet and a tensely extending support structure for supporting the flexible optical lens while tensely extending the flexible optical lens, said tensely extending support structure comprising:

a first frame body having a fixing portion at each end to which at least one of a pair of opposite edges of the flexible optical lens is fixed; and a second frame body, into which said first frame body is fitted, having a holding portion with a lower surface complementary to an upper surface of said fixing portion for fixing the flexible optical lens therebetween, and a side portion being in contact with an outer lateral surface of said first frame body, said holding portion of said second frame body having at least a pair of tensely extending portions adjacent to one fixing portion of said first frame body and extending downwardly from a portion of the lower surface of said holding portion for bringing the flexible optical lens into tight contact with an inner surface of said first frame body.

9. The combination according to claim 8, wherein said second frame body has a cut-out in a corner thereof at a location inside of the holding portion.

10. The combination according to claim 8, wherein said holding portion of said second frame body has a rigid plate located between the pair of tensely extending portions.

11. The combination according to claim 10, wherein each one of said pair of tensely extending portions has a vertical cross section forming a sector, which has a greater radius than a thickness of said rigid plate.

12. The combination according to claim 10, wherein each one of said pair of tensely extending portions has resiliency, and said sector of each one of said pair of tensely extending portions has an interior angle of not less than 90°.

13. The combination according to claim 8, wherein two pairs of edges of said film or sheet are fixed to said fixing portion of said first frame body, and said second frame body has two pairs of tensely extending portions.

* * * * *